United States Patent
Tolvanen

(10) Patent No.: US 9,216,662 B2
(45) Date of Patent: Dec. 22, 2015

(54) METHOD AND APPARATUS FOR MAXIMIZING ENERGY EFFICIENCY OF AN ELECTRIC DRIVE SYSTEM

(71) Applicant: ABB TECHNOLOGY OY, Helsinki (FI)

(72) Inventor: Jukka Kalevi Tolvanen, Helsinki (FI)

(73) Assignee: ABB TECHNOLOGY OY, Helsinki (FI)

( * ) Notice: Subject to any disclaimer, the term of this patent is extended or adjusted under 35 U.S.C. 154(b) by 70 days.

(21) Appl. No.: 14/086,559

(22) Filed: Nov. 21, 2013

(65) Prior Publication Data

US 2014/0142794 A1 May 22, 2014

(30) Foreign Application Priority Data

Nov. 21, 2012 (FI) ...................................... 20126222

(51) Int. Cl.
*B60W 10/08* (2006.01)
*B60L 15/20* (2006.01)
*H02P 6/00* (2006.01)
*B60K 1/02* (2006.01)

(52) U.S. Cl.
CPC . *B60L 15/20* (2013.01); *H02P 6/00* (2013.01); *Y02T 10/7258* (2013.01)

(58) Field of Classification Search
CPC ......... B60W 10/08; B60W 20/00; B60K 1/02
USPC ................................................ 701/22, 84, 91
See application file for complete search history.

(56) References Cited

U.S. PATENT DOCUMENTS

| 5,239,251 A | 8/1993 | Lauw | |
| 5,272,429 A | 12/1993 | Lipo et al. | |
| 2002/0180398 A1 | 12/2002 | Nakatsugawa et al. | |
| 2005/0107199 A1* | 5/2005 | Minagawa | 475/5 |
| 2005/0277501 A1* | 12/2005 | Kuras et al. | 474/8 |
| 2008/0039261 A1* | 2/2008 | Cho et al. | 475/5 |
| 2009/0115352 A1 | 5/2009 | Heap et al. | |

FOREIGN PATENT DOCUMENTS

JP      2010-088238 A      4/2010

OTHER PUBLICATIONS

Finnish Search Report for FI 20126222 dated Jun. 6, 2013.

* cited by examiner

*Primary Examiner* — Tan Q Nguyen
(74) *Attorney, Agent, or Firm* — Buchanan Ingersoll & Rooney PC

(57) ABSTRACT

A method and an apparatus are provided for maximizing energy efficiency of an electric drive system including an electric motor and a load. In the method, the torque characteristics of the system can be selected from two types of behavior: linear and quadratic behavior of a torque of the motor in respect to a rotational speed of the motor. The method gathers a plurality of data points and with which behavior the data points correlate best. The torque characteristics to be used are determined on the basis of the correlation, and the motor is controlled on the basis of the determined torque characteristics. The apparatus implements the method.

11 Claims, 2 Drawing Sheets

METHOD AND APPARATUS FOR MAXIMIZING ENERGY EFFICIENCY OF AN ELECTRIC DRIVE SYSTEM

RELATED APPLICATION

This application claims priority under 35 U.S.C. §119 to European Patent Application No. 20126222 filed in Europe on Nov. 21, 2012, the entire content of which is hereby incorporated by reference in its entirety.

FIELD

The present disclosure relates to electric drive systems, and more particularly, to a method and apparatus for maximizing energy efficiency of an electric drive system.

BACKGROUND INFORMATION

Manufacturers of frequency converters can utilize various techniques in controlling the behavior of the torque of a motor with respect to a rotational speed of the motor in an electric drive application.

The applications can, for example, be divided into two groups on the basis of the behavior of the load: linear torque/speed ratio applications and quadratic torque/speed ratio applications. In linear (torque/speed ratio) applications, the torque applied to the load is directly proportional to the rotational speed. In quadratic (torque/speed ratio) applications, the torque is proportional to the square of the rotational speed.

Some linear applications, such as constant-torque loads found in industrial applications, can require high dynamic performance. In order to be able to maintain a full torque output from the motor at various motor speeds, the drive provides the motor with a nominal flux.

However, in some quadratic applications, such as pump or fan applications, the dynamic performance requirements cannot be as demanding as in linear applications. In such applications, the flux applicable by the drive can be limited, thus allowing more economic performance. On the other hand, this approach can result in a reduced dynamic performance of the drive, as there is a more limited flux capability available than with the nominal flux.

In some frequency converters, one of the above approaches, i.e. a more dynamic performance or a more economic performance, can be selected as the default performance approach, and the other can be selected by the user. The user does not, however, always select the more appropriate approach for the application in question.

SUMMARY

An exemplary embodiment of the present disclosure provides a method for maximizing energy efficiency of an electric drive system including an electric motor and a load. The exemplary method includes determining torque characteristics of the system, wherein the torque characteristics are selected from two types of behavior: (i) linear behavior of a torque of the motor with respect to a rotational speed of the motor, and (ii) quadratic behavior of a torque of the motor with respect to a rotational speed of the motor. The exemplary method also includes controlling the motor on the basis of the determined torque characteristics.

An exemplary embodiment of the present disclosure provides an apparatus for maximizing energy efficiency of an electric drive system including an electric motor and a load. The exemplary apparatus includes means for determining the torque characteristics, wherein the torque characteristics of the system are selected from two types of behavior: (i) linear behavior of a torque of the motor with respect to a rotational speed of the motor, and (ii) quadratic behavior of a torque of the motor with respect to a rotational speed of the motor. The exemplary apparatus also includes means for controlling the motor on the basis of the determined torque characteristics.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a method and an apparatus for implementing the method which alleviate the aforementioned disadvantages.

The method of the present disclosure allows for automatized selection of the operating mode, i.e. a dynamic performance mode where a nominal flux is used or an economic performance mode where the flux is limited in order to achieve energy savings.

In accordance with an exemplary embodiment, the method of the present disclosure first gathers a set of data points of torques at different rotational speeds. Then, the method calculates with which behavior of the load, i.e. the linear behavior or the quadratic behavior, the data points have better correlation. On the basis of the result of this calculation, one of the two torque/speed behaviors is selected to represent the torque characteristics of the system, and the motor is controlled on the basis of the selected behavior. As the behavior is automatically determined, selecting a more appropriate operating mode does not have to rely on user input.

In accordance with an exemplary embodiment, the present disclosure provides a method for maximizing energy efficiency of an electric drive system including an electric motor and a load. The disclosed method allows automatic detection of different behaviors of torque of the motor with respect to a rotational speed of the motor, i.e. detection of different torque/speed ratios.

In the disclosed method, the torque characteristics of the system can be selected from two types of behavior: linear behavior and quadratic behavior of the torque in respect to the rotational speed.

Figure 1:
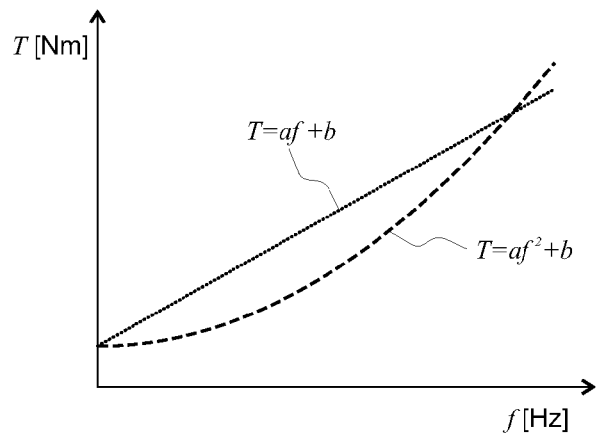
FIG. 1 illustrates linear and quadratic behavior of torque with respect to a rotational speed.

FIG. 1 illustrates the linear and quadratic system behavior of torque with respect to a rotational speed. The linear behavior (dotted line) represents a situation where the torque T is directly proportional to the rotational speed f:

$$T = af + b, \qquad (1)$$

where a is a coefficient which represents the relation between the torque and the rotational speed, and b represents a constant torque which is independent from the rotational speed.

The quadratic behavior (dashed line) represents a situation where the torque is proportional to the square of the rotational speed f:

$$T = af^2 + b. \quad (2)$$

Again, a represents the relation between the torque and the rotational speed, and b represents a constant torque which is independent from the rotational speed.

In order to be able to maximize the energy efficiency, the method of the present disclosure automatically determines torque characteristics of the system in question, i.e. which of Equations (1) and (2) better describes the system. The motor can then be controlled on the basis of the determined torque characteristics.

Determining torque characteristics can, for example, include determining the torque of the motor and the rotational speed of the motor. The torque and rotational speed can be directly measured, or they can also be estimated, for example, by a frequency converter controlling the motor. If information on how much power is supplied to the motor is available, the torque can be calculated from the power. The rotational speed can be determined from the output frequency of the frequency converter.

The method of the present disclosure can then gather a plurality of data points, where each data point represents the torque of the motor at a rotational speed of the motor.

On the basis of the data points, a value for a first parameter can be calculated. The first parameter represents how much the data points deviate from the quadratic behavior. A value for a second parameter is also calculated on the basis of the data points. The second parameter, in turn, represents how much the data points deviate from the linear behavior. Then, the first parameter can be compared with the second parameter, and the torque characteristics can be determined on the basis of the comparison.

When the torque characteristics have been determined, the motor can be controlled on the basis of the determined torque characteristics. On the basis of the torque characteristics, the operating mode, i.e. the dynamic performance mode where the flux is not limited or the economic performance mode where the flux is limited in order to improve energy efficiency, can be chosen.

If the electric drive system is controlled on the basis of a torque reference, and if the electric drive can initially bet set to the economic performance mode, determining the torque characteristics can also be accomplished by monitoring the rate of change of the torque reference or the difference between the torque reference and the actual torque.

For example, the magnitude of the rate of change of the torque reference can first be determined. The magnitude can then be compared with a set limit, and if the magnitude exceeds the set limit, the electric drive can be set to the dynamic performance mode.

Alternatively, the torque of the motor can first be determined. The difference between the torque reference and the determined torque can then be determined and compared with a set limit. If the difference exceeds the set limit, the electric drive is set to the dynamic performance mode.

Figure 2:
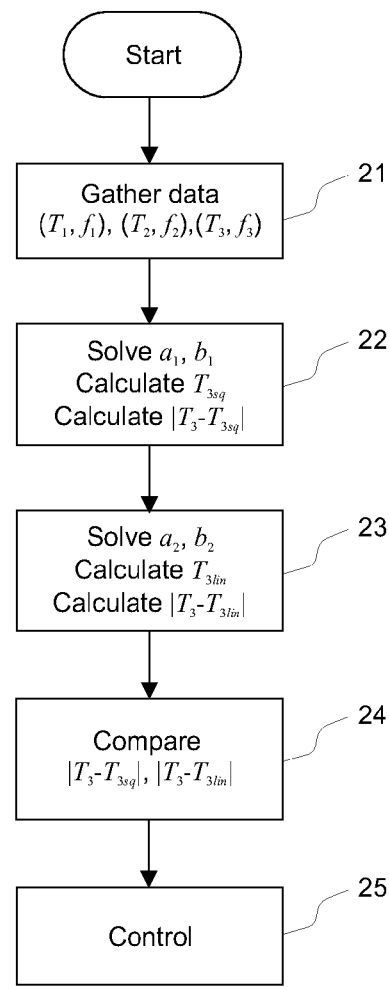
FIG. 2 illustrates a flowchart of an exemplary implementation of the method of the present disclosure.

FIG. 2 illustrates a flowchart of an exemplary implementation of the method of the present disclosure. In step 21, the torque and the rotational speed are measured and data points representing the torque and rotational speed are gathered.

In step 22, the value for a first parameter is calculated. Two equations are formed on the basis of two data points, for example $(T_1, f_1)$ and $(T_2, f_2)$. For each data point, the torque is represented by the square of the rotational speed multiplied by a first coefficient and incremented by a second coefficient. The equations for the two data points $(T_1, f_1)$ and $(T_2, f_2)$ have the same coefficients $a_{sq}$ and $b_{sq}$:

$$T_1 = a_{sq} f_1^2 + b_{sq}, \quad (3)$$

$$T_2 = a_{sq} f_2^2 + b_{sq}. \quad (4)$$

The values of the coefficients $a_{sq}$ and $b_{sq}$ can then be solved as follows:

$$a_{sq} = \frac{T_1 - T_2}{f_1^2 - f_2^2}, \quad (5)$$

$$b_{sq} = \frac{T_2 f_1^2 - T_1 f_2^2}{f_1^2 - f_2^2}. \quad (6)$$

On the basis of the coefficients $a_{sq}$ and $b_{sq}$ and the rotational speed $f_3$ at a third data point, an expected torque $T_{3sq}$ for the rotational speed in the third data can be calculated.

$$T_{3sq} = a_{sq} f_3^2 + b_{sq}. \quad (7)$$

The difference between the expected torque $T_{3sq}$ and the torque $T_3$ at the third data point can then be calculated, and the magnitude $|T_3 - T_{3sq}|$ of the difference can be used as the value of the first parameter.

In step 23, the value for a second parameter is calculated. Calculating the value for the second parameter in step 23 can be performed in a similar manner to that in step 22. Two equations are formed on the basis of two data points, for example $(T_1, f_1)$ and $(T_2, f_2)$. For both data points, the torque is represented by the rotational speed multiplied by a first coefficient and incremented by a second coefficient. The equations for the two data points $(T_1, f_1)$ and $(T_2, f_2)$ have the same coefficients $a_{lin}$ and $b_{lin}$:

$$T_1 = a_{lin} f_1 + b_{lin}, \quad (8)$$

$$T_2 = a_{lin} f_2 + b_{lin}. \quad (9)$$

Values of the coefficients $a_{lin}$ and $b_{lin}$ can be solved as follows:

$$a_{lin} = \frac{T_1 - T_2}{f_1 - f_2}, \quad (10)$$

$$b_{lin} = \frac{T_2 f_1 - T_1 f_2}{f_1 - f_2}. \quad (11)$$

An expected torque $T_{3lin}$ for a rotational speed at the third data point is calculated on the basis of the coefficients $a_{lin}$ and $b_{lin}$ and the rotational speed $f_3$ at the third data point:

$$T_{3lin} = a_{lin} f_3^2 + b_{lin}. \quad (12)$$

The difference between the expected torque $T_{3lin}$ and the torque $T_3$ at the third data point can then be calculated, and the magnitude $|T_3 - T_{3lin}|$ of the difference can be used as the value of the second parameter.

In step 24 in FIG. 1, the first parameter is compared with the second parameter and the torque characteristics of the system are determined on the basis of the comparison. The behavior, i.e. the linear or quadratic torque/speed ratio, which better fits the data points can be selected as the system torque characteristics.

Finally, in step 25, the motor is controlled on the basis of the determined torque characteristics.

Calculation of the first and the second parameter is not, however, limited to the above examples. In some applications, where accurate measurements are not easily obtained, the method of least squares can, for example, be used. For example, the data points can be fitted to Equations (1) and (2) by using the method of least squares, and the torque characteristics to be used can then be selected on the basis of the best fit. On the other hand, the method of least squares is computationally somewhat more complex than the three-point curve fitting as disclosed in Equations (3) to (12).

Figure 3:
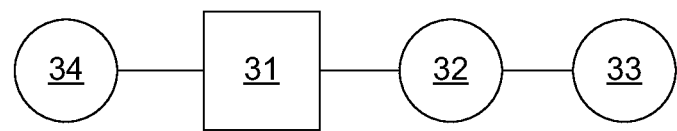
FIG. 3 illustrates an apparatus for maximizing energy efficiency of an electric drive system including an electric motor and a load, according to an exemplary embodiment of the present disclosure.

FIG. 3 illustrates an apparatus 31 for maximizing energy efficiency of an electric drive system including an electric motor 32 and a load 33. As an example, the load 33 in FIG. 3 is a fan which is rotated by the motor 32. In this example, the apparatus 31 in FIG. 3 is a frequency converter which controls the motor 32 and implements the disclosed method. The frequency converter 31 automatically selects appropriate torque characteristics to be used, depending on the application. The torque characteristics in the frequency converter 31 can be selected from two types of behavior: linear and quadratic behavior of torque of the motor with respect to a rotational speed of the motor.

The frequency converter 31 acts as means for determining the torque of the motor and the rotational speed of the motor 32. In FIG. 3, the frequency converter 31 has internal estimates of the variables. The frequency converter 31 gathers a plurality of data points to its internal memory (e.g., a non-transitory computer-readable recording medium such as a non-volatile memory). Each data point represents the torque of the motor at a rotational speed of the motor.

The frequency converter 31 in FIG. 3 includes computing means, such as a microprocessor, a DSP, an FPGA, or an ASIC, which are used for calculating the value for a first and a second parameter on the basis of the data points. The computing means can be configured to execute instructions or a computer program tangibly recorded on the internal memory of the frequency converter 31. The first parameter represents how much the data points deviate from the quadratic behavior of the torque, and the second parameter represents how much the data points deviate from the linear behavior of the torque. The calculation of the values for the first parameter and the second parameter can, for example, be performed as disclosed in the exemplary implementation of FIG. 2.

After calculating the first and the second parameter, the computing means of the frequency converter 31 compare the first parameter with the second parameter, and determine the torque characteristics on the basis of the comparison. The frequency converter 31 then controls the motor by using determined torque characteristics.

The apparatus for maximizing the energy efficiency can also be an external device attached to a frequency converter. The apparatus can determine the behavior of the system as disclosed above and can then set the frequency converter to an appropriate operating mode, i.e. the dynamic performance mode or the economic performance mode.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for maximizing energy efficiency of an electric drive system including an electric motor, a load, and a frequency converter controlling the motor, the method comprising:
    determining, by using the frequency converter, torque characteristics of the electric drive system, wherein the torque characteristics are selected from two types of behavior: (i) linear behavior of a torque of the motor with respect to a rotational speed of the motor, and (ii) quadratic behavior of a torque of the motor with respect to a rotational speed of the motor;
    selecting an operating mode on the basis of the determined torque characteristics; and
    controlling the motor in the selected operating mode.

2. A method as claimed in claim 1, wherein the determining of the torque characteristics comprises:
    determining a torque of the motor and a rotational speed of the motor;
    gathering a plurality of data points, each data point respectively representing the torque of the motor at the rotational speed of the motor;
    calculating a value for a first parameter on the basis of the data points, the first parameter representing how much the data points deviate from the quadratic behavior of the torque;
    calculating a value for a second parameter on the basis of the data points, the second parameter representing how much the data points deviate from the linear behavior of the torque;
    comparing the first parameter with the second parameter; and
    determining the torque characteristics on the basis of the comparison.

3. A method as claimed in claim 2, wherein the calculating of the value for the first parameter comprises:
    forming two equations on the basis of two data points, wherein, for each data point, the torque is the square of the rotational speed multiplied by a first coefficient and incremented by a second coefficient, and wherein the two equations both have the same coefficients;
    solving the values of the coefficients;
    calculating an expected torque for a rotational speed at a third data point on the basis of the coefficients and the rotational speed at the third data point;
    calculating the difference between the expected torque and the torque at the third data point; and
    using the difference as the value of the first parameter, and wherein calculating of the value for the second parameter comprises:
    forming two equations on the basis of two data points, wherein, for each data point, the torque is the rotational speed multiplied by a first coefficient and incremented by a second coefficient, and wherein the two equations both have the same coefficients,
    solving the coefficients;
    calculating an expected torque for a rotational speed at a third data point on the basis of the coefficients and the rotational speed at the third data point;
    calculating the difference between the expected torque and the torque at the third data point; and
    using the difference as the value of the second parameter.

4. A method as claimed in claim 3, wherein the torque is calculated from a determined power supplied to the motor.

5. A method as claimed in claim 2, wherein the torque is calculated from a determined power supplied to the motor.

6. A method as claimed in claim 1, wherein the electric drive system is controlled on the basis of a torque reference, wherein the electric drive is initially set to an economic performance mode where flux is limited to achieve energy savings, and wherein the determining of the torque characteristics comprises:
    determining a magnitude of a rate of change of the torque reference;
    comparing the magnitude with a set limit; and if the magnitude exceeds the set limit, setting the electric drive to a dynamic performance mode where the flux is not limited.

7. A method as claimed in claim 1, wherein the electric drive system is controlled on the basis of a torque reference, wherein the electric drive is initially set to an economic performance mode where flux is limited in order to improve energy efficiency, and wherein the determining of the torque characteristics comprises:
- determining a torque of the motor;
- determining the difference between the torque reference and the determined torque;
- comparing the difference with a set limit; and
- if the difference exceeds the set limit, setting the electric drive to a dynamic performance mode where the flux is not limited.

8. An apparatus for maximizing energy efficiency of an electric drive system including an electric motor, a load, and a frequency converter controlling the motor, the apparatus comprising:
- means for determining, by using the frequency converter, torque characteristics of the electric drive system, wherein the torque characteristics of the electric drive system are selected from two types of behavior: (i) linear behavior of a torque of the motor with respect to a rotational speed of the motor, and (ii) quadratic behavior of a torque of the motor with respect to a rotational speed of the motor; and
- means for selecting an operating mode, on the basis of the determined torque characteristics.

9. An apparatus as claimed in claim 8, wherein the means for determining the torque characteristics comprise:
- means for determining a torque of the motor and a rotational speed of the motor;
- means for gathering a plurality of data points, each data point respectively representing the torque of the motor at the rotational speed of the motor;
- means for calculating a value for a first parameter on the basis of the data points, the first parameter representing how much the data points deviate from the quadratic behavior of the torque;
- means for calculating a value for a second parameter on the basis of the data points, the second parameter representing how much the data points deviate from the linear behavior of the torque;
- means for comparing the first parameter with the second parameter;
- means for determining the torque characteristics on the basis of the comparison; and
- means for controlling the motor on the basis of the determined torque characteristics.

10. An apparatus as claimed in claim 8, wherein the apparatus comprises:
- a non-transitory computer-readable recording medium having a program tangibly recorded thereon; and
- a processor configured to execute the program recorded on the non-transitory computer-readable recording medium,
- wherein the means for determining the torque characteristics are comprised in the processor.

11. An apparatus as claimed in claim 8, comprising:
- means for controlling the motor in the selected operating mode.

* * * * *